May 11, 1965 I. E. FAIR 3,183,447

VOLTAGE-CONTROLLED NONDISPERSIVE VARIABLE DELAY SYSTEM UTILIZING MODULATION TO PASS SIGNAL AND FREQUENCY-INVERTED SIGNAL THROUGH IDENTICAL DISPERSIVE DELAY LINES

Filed Sept. 11, 1962

INVENTOR
I. E. FAIR
BY Roy M. Porter Jr.
ATTORNEY

United States Patent Office 3,183,447

Patented May 11, 1965

3,183,447

VOLTAGE-CONTROLLED NONDISPERSIVE VARIABLE DELAY SYSTEM UTILIZING MODULATION TO PASS SIGNAL AND FREQUENCY-INVERTED SIGNAL THROUGH IDENTICAL DISPERSIVE DELAY LINES

Irvin E. Fair, Center Valley, Pa., assignor to Bell Telephone Laboratories, Incorporated, New York, N.Y., a corporation of New York Filed Sept. 11, 1962, Ser. No. 222,788
5 Claims. (Cl. 328—177)

Figure 1:
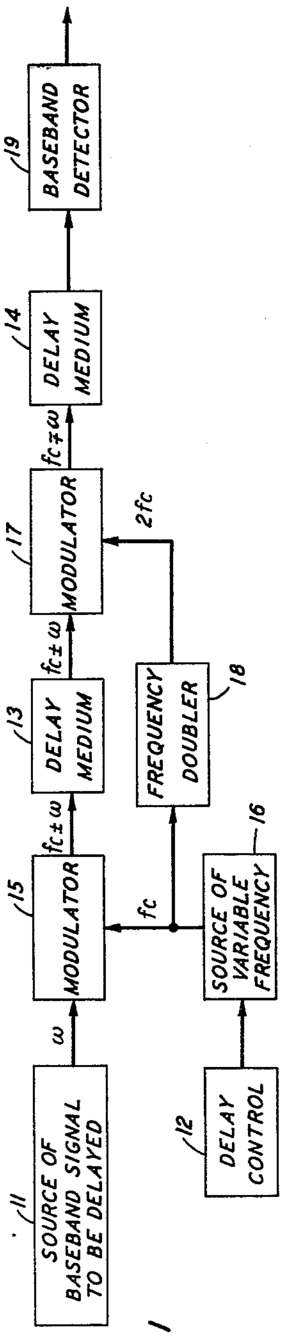

This invention relates to apparatus for introducing a variable time delay to electromagnetic wave energy and more particularly to an ultrasonic delay system that introduces an electrically variable delay that is uniform over a very broad band.

Ultrasonic devices such as delay lines take advantage of the fact that the velocity of propagation of a mechanical vibration or ultrasonic wave is much lower than that of electrical signals by transforming the electrical signal into the ultrasonic wave, sending the ultrasonic wave down a mechanical path of predetermined length and composition, and reconverting the wave into an electrical signal at the far end. The amount of delay in a typical medium is determined by the physical length of the delay path, the velocity of sound therein and the frequency of the ultrasonic energy. Attempts have been made in the prior art to vary this delay time by changing the physical length of the line or by changing its temperature of operation. These systems are obviously awkward, slow acting and unreliable.

Control of delay by varying the frequency relies upon the property of certain types of lines known as thin dispersive characteristic, that is, the delay characteristic thereof is a function of frequency. By varying the carrier frequency of the applied energy it has been proposed to vary the delay by causing the carrier to fall upon the desired point of the delay vs. frequency characteristic of the line. However, the line is dispersive not only for different carrier frequencies, but also for frequencies within the band of the desired signal. If this signal is a modulated one, the result of the dispersion within the signal band produces a very undesirable phase distortion of its signal sidebands. If this signal is a pulse train of digital information, the result of dispersion spreads the pulses into overlapping relationships with each other.

It is, therefore, an object of the present invention to introduce a readily variable amount of delay uniformly to all components in a broadband high frequency signal.

It is a further object to eliminate dispersion in variable ultrasonic delay systems.

These objects are accomplished in accordance with the present invention by a novel, double modulation system using two substantially identical sections of dispersive delay medium. The signal applied to the first section is initially modulated upon a carrier of adjustable frequency so that the time delay through the first section may be varied by varying the carrier frequency. The variable carrier frequency is then doubled and a second modulation is performed upon the output of the first section. The second modulation inverts all signal components in the output of said first delay medium in the frequency spectrum about the carrier frequency. When the inverted signal is applied to the second section, all dispersion and delay distortion introduced by the first section is equalized by the second section. A total time delay that is equal to twice the delay of each section is substantially uniformly introduced across the band.

Figure 2:
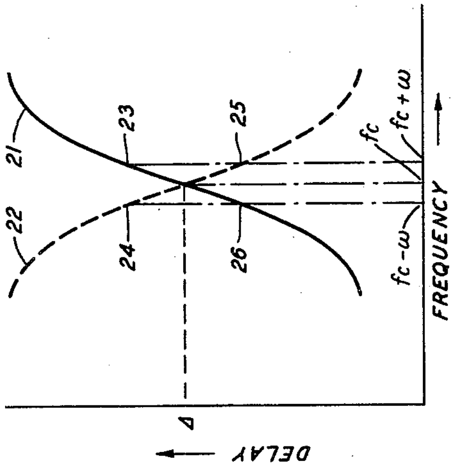

These and other objects, the nature of the present invention, its various features and advantages will appear more fully upon consideration of the various illustrative embodiments now to be described in detail in connection with the accompanying drawing, in which:

FIG. 1 is a schematic diagram in block form of a delay system in accordance with the present invention; and FIG. 2 shows a typical delay vs. frequency characteristic of a dispersive ultrasonic delay line and is useful in explaining the invention.

Referring more particularly to FIG. 1, the source of the signal to be delayed is represented by 11. The signal from this source comprises the original intelligence bearing signal, usually referred to as a "base-band" signal, which has been separated from any carrier which it may previously have had. Such a base-band signal would comprise the demodulated sidebands of an amplitude or frequency modulated signal or may comprise a train of pulses representing digital information. For purposes unrelated to the scope of the present invention, it is desired to delay this signal by a time amount which must be varied over a wide range in accordance with an electrical quantity from source 12. A typical application which is receiving considerable attention at the present time will serve to illustrate the importance and utility of the invention. Thus, in communication with a satellite, an appreciable delay is inherently introduced to the received signal because of the very great distance to and from the satellite. This delay can be compensated by introducing artificial delay either into the satellite communication path or into an associated path. However, as the satellite moves rapidly through space, the distance to a given ground station varies and consequently the delay changes. Therefore, the proper compensating delay must be smoothly varied in accordance with some predetermined or electrically derived signal representing the movement of the satellite. Further, if communication is substantially instantaneously shifted from one satellite to another in a different orbit position, the compensating delay must be substantially instantaneously changed from one value to a second very different value. A similar requirement is found in electronic telephone switching systems, in systems for converting from one television standard to another and in numerous military systems now employing unsatisfactory mechanically variable delay systems. Thus, sources 11 and 12 are merely representative of sources of the base-band signal and the delay control signal, respectively in these or in other applications.

The delay media 13 and 14 are according to a preferred form of the invention substantially identical, and each may comprise any of the various types of delay media known in the art to produce a delay which is dependent upon the frequency of the energy applied thereto. Elongated ultrasonic delay lines of various cross-sectional configurations have been used heretofore to this end. Ultrasonic lines, quite satisfactory for this purpose, have been disclosed in an article by T. R. Meeker entitled "Dispersive Ultrasonic Delay Lines Using the First Longitudinal Mode in a Strip," I.R.E. Transactions on Ultrasonic Engineering, volume UE-7, No. 2, June 1960, pages 53–58. The delay lines of this article provide typical delay vs. frequency characteristics such as illustrated by curve 21 of FIG. 2.

Modulator 15 superimposes the base-band signal from source 11 upon a carrier frequency from source 16. The frequency of source 16 is determined by the delay control circuit 12 to be that frequency which at the particular moment produces the desired delay through media 13 and 14. For example, assume that the base-band intelligence signal includes frequencies up to and including $\omega$ and that the first delay medium 13 is desired to introduce a delay $\Delta$ to this signal. Referring to FIG. 2, it will be seen that the delay $\Delta$ falls upon a frequency $f_c$ on the dispersive delay characteristic 21 of medium 13. Therefore, the intelligence $\omega$ is impressed upon $f_c$ so that the output of modulator 15 becomes $f_c \pm \omega$. This double sideband signal may be impressed on delay line 13 or if the bandwidth of the signal is large compared to the linear portion of characteristic 21, modulator 15 may be one of several known single sideband types so that the output thereof is restricted to only one sideband, such as $f_c + \omega$. In either event, the delay for all components of the signal may be varied by varying the frequency of $f_c$ up and down characteristic 21.

The principal applications of the invention contemplated that $f_c$ will thus be varied under the control of an electrical signal from source 12. Thus, source 16 will comprise any of the numerous oscillator circuits in which the resonant frequency may be varied by a voltage, current, or other electrical indication applied thereto. For example, magnetrons, Klystrons and similar oscillators produce output frequencies that depend upon the voltage applied to certain of their electrodes. In such an arrangement source 12 would supply the variable voltage to the proper electrode. Other oscillator circuits are known to the art in which a capacitive diode or a reactance tube is included in one way or another in the resonant circuit of the oscillator. Varying the bias applied to the diode or to the reactance tube varies its capacitance or reactance, respectively, and thus the oscillatory frequency. With such a circuit, source 12 would supply the variable bias. It should be noted that other important applications, including the use of the invention in laboratory test equipment, involve manual adjustment of $f_c$. For this purpose, source 16 would include a resonant circuit having a tunable inductance or capacitance which is adjusted to vary $f_c$.

Regardless of the form of source 16 and its control circuit 12, their function is to vary the frequency $f_c$ in some desired manner to vary the delay introduced by medium 13 to all components of the signal applied thereto. Referring again to FIG. 2 it will be seen, however, that all of these components will not be delayed equally since the high frequency components $f_c + \omega$ are delayed more than $\Delta$ as represented by point 23 on curve 21, the low frequency components $f_c - \omega$ are delayed less than $\Delta$ as represented by point 26, and intermediate frequencies are subject to various delays in accordance with the substantially linear delay vs. frequency characteristic over the frequency band of interest.

This output from delay medium 13 is now applied to modulator 17 which inverts all components about a frequency which is varied identically with the variation of $f_c$ in accordance with the invention. This inversion process is such that the signal band is inverted in the frequency spectrum so that energy formerly carried in the highest frequency component of the upper sideband appears in the lowest frequency component of the lower sideband. While there are several ways in which inversion about a suitable frequency may be accomplished, a feature of the present invention resides in the simple and effective way illustrated. Thus, a signal is derived that is always twice $f_c$ regardless of how $f_c$ is varied by doubling the frequency of a portion of the output of source 16 in frequency doubler 18. The output of delay medium 13 is then mixed in a suitable modulator 17 with the doubled signal $2f_c$ and the lower sideband of this modulation selected. Special filtering mechanisms are not ordinarily required to select the lower sideband because the upper sideband has a frequency $3f \pm \omega$ and falls outside the band of sensitivity of the ultrasonic transducers associated with delay medium 14. The frequency components in the selected lower sideband will be inverted because:

$$2f_c - (f_c \pm \omega) = f_c \mp \omega \quad (1)$$

This signal is applied to delay medium 14 which has the same delay vs. frequency characteristic as medium 13 and since $f_c \mp \omega$ subtends exactly the same portion of the delay vs. frequency characteristic of medium 13 as did $f_c \pm \omega$ of medium 13, the average delay through both media are equal and will each be varied identically in response to variations of $f_c$. The effect of the inversion, however, is such that the energy components of the signal in medium 14 appear to have been delayed in accordance with the dotted curve 22 of FIG. 2 which constitutes a mirror image of curve 21 transposed about the value of $f_c$ at any given time. If curves 21 and 22 are compared, it will be seen that they complement each other over the frequency band of interest. The delay greater than $\Delta$ for the high frequency component in medium 13 as was represented by point 23 will be compensated by the delay less than $\Delta$ in medium 14 as represented by point 25. Points 24 and 26 represent a similar compensation at the lower frequencies and compensation will exist for all frequencies in the band so long as $f_c$ and its associated signal sidebands fall within the substantially linear portion of the delay characteristic. Beyond the linear portion, compensation is still substantial although not necessarily complete. Thus, the total delay through both media 13 and 14 will be the same for all frequencies and will be numerically equal to $2\Delta$.

The intelligence signal will obviously leave delay medium 14 as the modulation upon the carrier $f_c$. Unless this represents the form of signal desired for subsequent operations in the system, the intelligence or base-band should be recovered by suitable detection or demodulation by a conventional base-band detector 19.

The principles of the invention have been illustrated in terms of ultrasonic techniques and delay lines since these devices presently provide delays with substantially linear delay vs. frequency characteristics, large bandwidths and large delays. They are simpler in construction, more reliable and less expensive than equivalent forms of delay media. However, it should be understood that the techniques of double modulation with the variable carrier frequency to vary delays may be practiced with delay media of other forms.

In all cases it is to be understood that the above-described arrangement is merely illustrative of one of a number of the many possible applications of the principles of the invention. Numerous and varied other arrangements in accordance with these principles may readily be devised by those skilled in the art without departing from the spirit and scope of the invention.

What is claimed is:

1. A delay system for controlling the magnitude of dispersionless delay introduced to a carrier modulated input signal comprising first and second substantially identical delay media each having a delay characteristic that varies with frequency, means for variably modifying said carrier frequency of said input signal and for applying said modified signal to said first delay medium to dispersively delay said input signal, and means for canceling said dispersion and doubling said delay including means for inverting about said carrier frequency the signal components in the output of said first delay medium and for applying the inverted signal components to said second delay medium.

2. A delay system for controlling the magnitude of dispersionless delay introduced to an input signal comprising first and second substantially identical delay media each having a delay characteristic that varies with frequency; a source of carrier energy of frequency falling within said characteristic; means for varying said carrier frequency in response to the magnitude of dispersionless delay desired; means for dispersively delaying said input signal in accordance with said delay characteristic including a first modulator means interconnecting said carrier source and said first medium for combining said input signal with a portion of said carrier energy; and means for neutralizing the dispersion introduced by said first delay medium including means for doubling the frequency of said carrier, a second modulator means for combining the output of said first medium with said doubled frequency carrier, and means for applying the lower sideband of said second modulator output to said second delay medium.

3. A delay system for controlling the magnitude of dispersionless delay introduced to a carrier modulated input signal comprising first and second similar dispersive ultrasonic delay lines having similar signal dispersion characteristics, means for varying the frequency of said carrier and applying said varied signal to said first line to dispersively delay said input signal, and means for canceling said dispersion including means for mixing the output of said first line with a second signal the frequency of which is higher than said output and which varies in proportion to said carrier frequency variation of said output and means for applying the difference between said second signal and said output to said second delay line.

4. A delay system for controlling the magnitude of dispersionless delay introduced to an input signal comprising first and second delay media having like delay characteristics which vary linearly with frequency over a portion of the characteristic, modulation means for impressing said input signal upon a carrier frequency falling within said linear portion of both said characteristics, means for adjusting said carrier frequency to correspond to a desired delay on said characteristic, means for applying said adjusted carrier modulated by said input signal to said first delay medium to dispersively delay said modulated signal, and means for neutralizing the dispersion introduced by said first delay medium including means for inverting about said given frequency the frequency spectrum of the signal components in the output of said first delay medium, and means for applying said inverted signal components to said second delay medium.

5. A delay system for controlling the magnitude of dispersionless delay introduced into an input signal comprising means for modulating a carrier frequency with said signals, means for dispersively delaying the modulation product including a first delay medium having a delay versus frequency characteristic and means for applying said modulation product to said first delay medium, means for neutralizing the dispersion introduced by said first delay medium including a second delay medium substantially identical to said first delay medium and means connected to the output of said first delay medium for inverting the signal frequency components about said carrier and for applying said inverted signal to said second delay medium, and means for varying said carrier frequency in response to the magnitude of the dispersionless delay desired.

References Cited by the Examiner

UNITED STATES PATENTS

| | | | |
|---|---|---|---|
| 2,633,492 | 3/52 | Ring | 333—28 |
| 2,982,926 | 5/61 | May | 333—28 |

HERMAN KARL SAALBACH, *Primary Examiner.*

DAVID G. REDINBAUGH, *Examiner.*